US012596669B2

(12) United States Patent　　　　　(10) Patent No.:　US 12,596,669 B2

Chuan　　　　　　　　　　　　　　　(45) Date of Patent:　　　Apr. 7, 2026

(54) REMOTELY CONTROLLING AND WIRELESSLY RECEIVING DEVICE

(71) Applicant: KUDOS MECHANICAL CO., LTD., New Taipei City (TW)

(72) Inventor: James Chuan, New Taipei City (TW)

(73) Assignee: KUDOS MECHANICAL CO., LTD., New Taipei City (TW)

( * ) Notice: Subject to any disclaimer, the term of this patent is extended or adjusted under 35 U.S.C. 154(b) by 0 days.

(21) Appl. No.: 18/810,480

(22) Filed: Aug. 20, 2024

(65) Prior Publication Data

US 2026/0050567 A1　　Feb. 19, 2026

(30) Foreign Application Priority Data

Aug. 16, 2024　(TW) ................................. 113131012

(51) Int. Cl.
　　*G06F 13/42*　　　(2006.01)
　　*G06F 13/38*　　　(2006.01)
(52) U.S. Cl.
　　CPC ........ *G06F 13/4282* (2013.01); *G06F 13/385* (2013.01); *G06F 2213/0042* (2013.01)
(58) Field of Classification Search
　　CPC .............................................. G06F 2213/0042
　　See application file for complete search history.

(56) References Cited

U.S. PATENT DOCUMENTS 6,633,800 B1　10/2003　Ward et al.
9,299,072 B2 *　3/2016　Khan ................. G06Q 20/3227

10,360,170 B2 *　7/2019　Kao ....................... G06F 13/385
11,524,879 B2　12/2022　Kohler et al.
11,729,782 B2 *　8/2023　Zhang ................... H04W 72/23
　　　　　　　　　　　　　　　　　　370/336
2015/0346792 A1 *　12/2015　Rathi ........................ G06F 1/26
　　　　　　　　　　　　　　　　　　713/310
2017/0124011 A1 *　5/2017　Verdino ................. H04W 4/12
2021/0089099 A1 *　3/2021　Lee ..................... H02J 7/00034
(Continued)

FOREIGN PATENT DOCUMENTS

CN　　　　209085657 U　　7/2019
EP　　　　　3213880 A1　　9/2017
(Continued)

*Primary Examiner* — Henry Tsai
*Assistant Examiner* — Aurangzeb Hassan
(74) *Attorney, Agent, or Firm* — METIS IP LLC

(57)　　　　　　　ABSTRACT

A remotely controlling and wirelessly receiving device includes a shell. A wireless communications module in the shell is configured to wirelessly connect an electronic device. A port of a port module is mounted on the shell, and the port is configured to have wired connection with an external device. When a user interface generates a signal to a processor module, the processor module sends a control command to the electronic device via the wireless communications module. When the processor module receives a work data outputted by the electronic device through the wireless communications module, the processor module relays and outputs the work data to the external device through the port of the port module. A user positioned far away from the electronic device is able to immediately acknowledge a working status of the electronic device according to the work data received and subsequently displayed by the external device.

19 Claims, 7 Drawing Sheets

(56) References Cited

U.S. PATENT DOCUMENTS

| | | | |
|---|---|---|---|
| 2022/0026899 A1 | 1/2022 | Kandula et al. | |
| 2022/0132455 A1* | 4/2022 | Gupta ................... | H04W 76/11 |
| 2025/0245885 A1* | 7/2025 | Ioffe ....................... | G06F 40/30 |

FOREIGN PATENT DOCUMENTS

| | | |
|---|---|---|
| TW | M589836 U | 1/2020 |
| TW | M628585 U | 6/2022 |
| WO | 2007135751 | 11/2007 |

* cited by examiner

REMOTELY CONTROLLING AND WIRELESSLY RECEIVING DEVICE

CROSS-REFERENCE TO RELATED APPLICATIONS

This application claims the priority benefit of TW application No. 113131012 filed on Aug. 16, 2024, the entirety of which is hereby incorporated by reference herein and made a part of specification.

TECHNICAL FIELD

The present invention relates to a combination of a controller and a receiver, more particularly a remotely controlling and wirelessly receiving device.

BACKGROUND

A hand tool is an important piece of equipment needed for constructions of many kinds, and thus a hand tool may be generally applied to many different industrial applications. Through the advancement of technology, an electronic hand tool, or a hand tool that has been developed to become electrically powered, can thus be generally defined as an electronic device. For example, an electronic device may be a hydraulic device such as an electrically powered hydraulic cutter or an electrically powered hydraulic crimper for handling cables.

In the present industrial era, most traditional mechanical hydraulic devices have developed to become electrically powered and electrically controlled by processor chips. A control chip of a hydraulic device helps generating, measuring, and displaying hydraulic pressures, recording environmental data of a work space, and, under some abnormal circumstances, displaying a warning message to a user for warning an abnormal working status of the hydraulic device. However, when the user wishes to obtain these data outputted by these hydraulic devices, the user may only respectively and manually connect a cable to a port of each of the hydraulic devices for data transfers.

At a construction site, it is very likely that various hydraulic devices are simultaneously working at different locations far apart from each other. Although it is possible for a user to respectively wirelessly control each of the hydraulic devices from a distance by using a controller, the controller may only one-sidedly send out commands to each of the hydraulic devices. This is problematic as the hydraulic devices are running independently from each other with unique working statuses, and the unique working statuses of these hydraulic devices cannot be reported back to the user with the controller. As a result, the user is merely blindly sending out commands through the controller to each of the hydraulic devices without obtaining the unique working statuses of these hydraulic devices.

SUMMARY

To overcome the aforementioned problems, the present invention provides a remotely controlling and wirelessly receiving device. The remotely controlling and wirelessly receiving device is able to work with an external device for wirelessly receiving work data outputted by at least one electronic device, thus allowing a user of the present invention to obtain a working status of the at least one electronic device from the received work data.

The remotely controlling and wirelessly receiving device of the present invention includes a shell, a wireless communications module, a port module, a processor module, and a user interface. The wireless communications module and the processor module are mounted in the shell, and the processor module is electrically connected to the wireless communications module, the port module, and the user interface. The wireless communications module is configured to wirelessly connect to an electronic device. The port module includes a port that is mounted on the shell, and the port is configured to have a wired connection with an external device. When the user interface outputs a control signal to the processor module, the processor module sends a control command to the electronic device through the wireless communications module. When the processor module is wirelessly connected to the electronic device through the wireless communications module, and when the processor module is wire-connected to the external device through the port of the port module, the processor module receives a work data outputted by the electronic device through the wireless communications module, and sends the work data to the external device through the port of the port module.

The remotely controlling and wirelessly receiving device of the present invention, not only is capable of wirelessly controlling the electronic device from a distance, but also functions as a relay for the work data outputted by the electronic device, thus relaying the work data from the electronic device to the external device. In an embodiment, the electronic device may be a hydraulic device, thus solving a problem described in prior arts. A user of the external device is able to read the work data obtained by the external device by using the external device, and thus gaining an understanding of a working status of the electronic device from a distance away from the electronic device. As the user gains the understanding of the working status of the electronic device from a distance away from the electronic device, the user would have a better and more realistic understanding of how to appropriately command the electronic device from a distance by using the remotely controlling and wirelessly receiving device for wirelessly sending out the control command to the electronic device.

DETAILED DESCRIPTION

Figure 1:
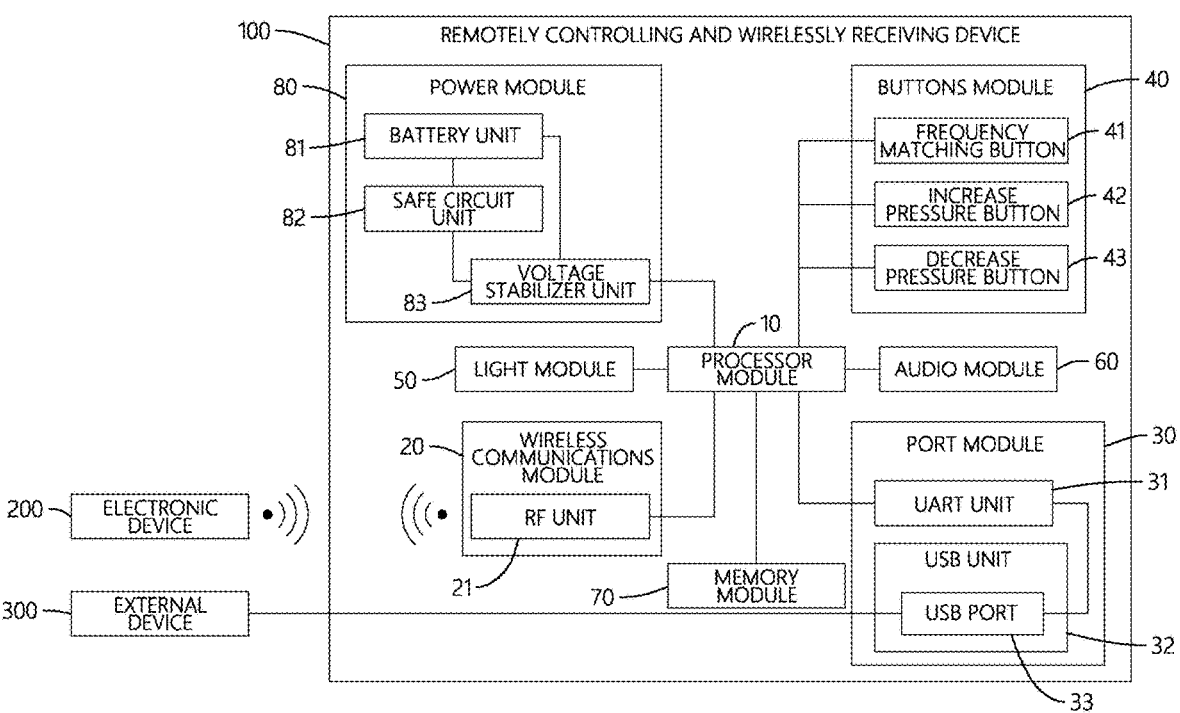
FIG. 1 is a block diagram of an embodiment of a remotely controlling and wirelessly receiving device of the present invention.
Figure 2:
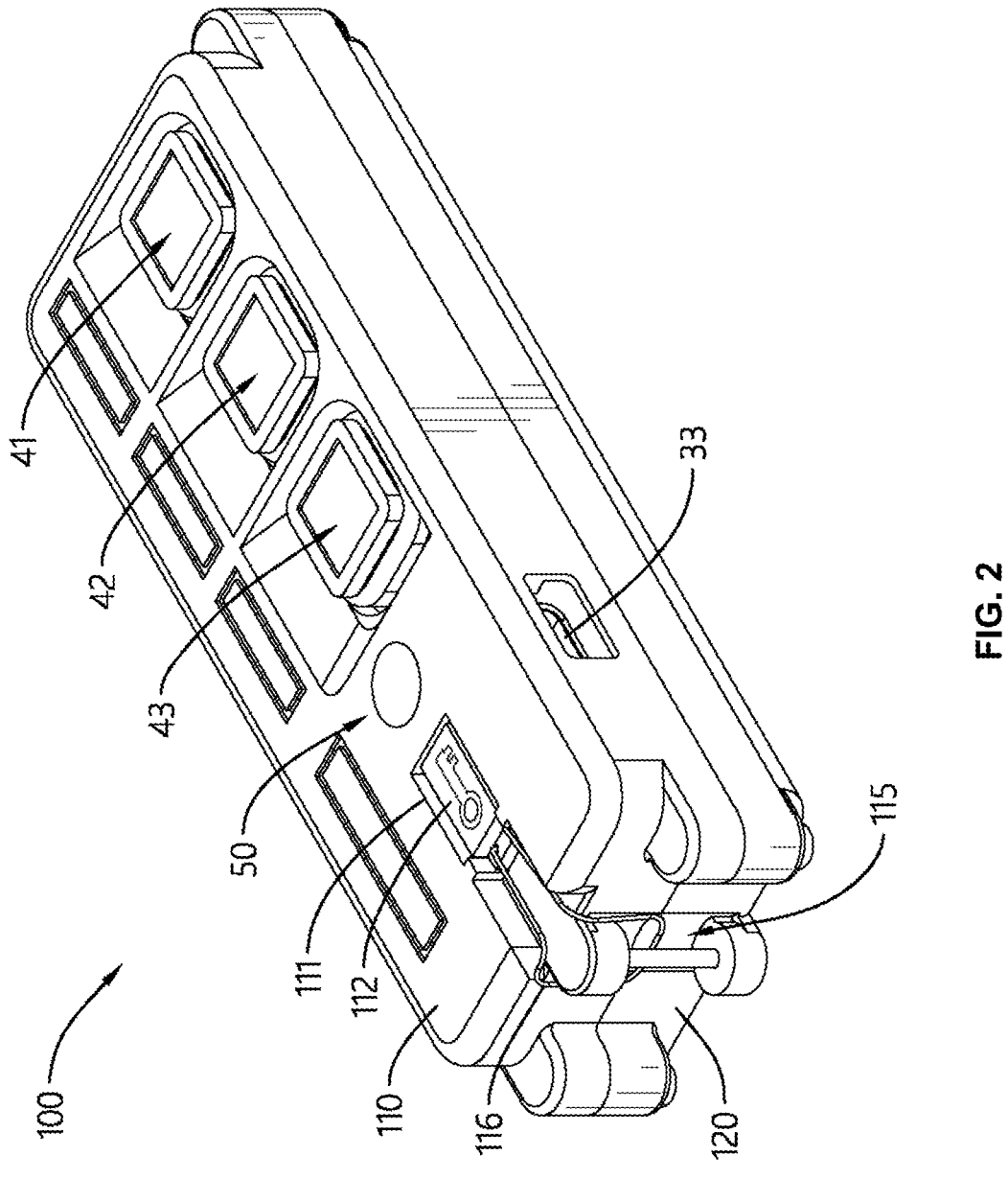
FIG. 2 is an external perspective view of the remotely controlling and wirelessly receiving device of the present invention.

With reference to FIGS. 1 and 2, the present invention provides a remotely controlling and wirelessly receiving device 100. The remotely controlling and wirelessly receiving device 100 includes a shell, and various modules are mounted in the shell. The remotely controlling and wirelessly receiving device 100 of the present invention is configured to wirelessly control an operation of at least one electronic device 200, and is configured to relay a working status of the at least one electronic device 200 to an external device 300 that is configured to wire-connect the remotely controlling and wirelessly receiving device 100 of the present invention. In terms of use, a user of the present invention would portably carry the remotely controlling and wirelessly receiving device 100 and the external device 300 to control a plurality of the electronic devices 200 from afar while also monitoring working statuses of the plurality of the electronic devices 200 from afar. This way, the user is able to efficiently gain an understanding of the working statuses of the plurality of the electronic devices 200 from a distance, and thus becoming self-aware how to more-appropriately wirelessly control the plurality of the electronic devices 200 through using the remotely controlling and wirelessly receiving device 100 of the present invention.

In an embodiment of the present invention, the shell consists of a combination of multiple shell components. For example, with reference to FIG. 2, the shell consists of an upper shell component 110 and a lower shell component 120. The upper shell component 110 and the lower shell component 120 are detachably connected to form the shell.

Figure 3:
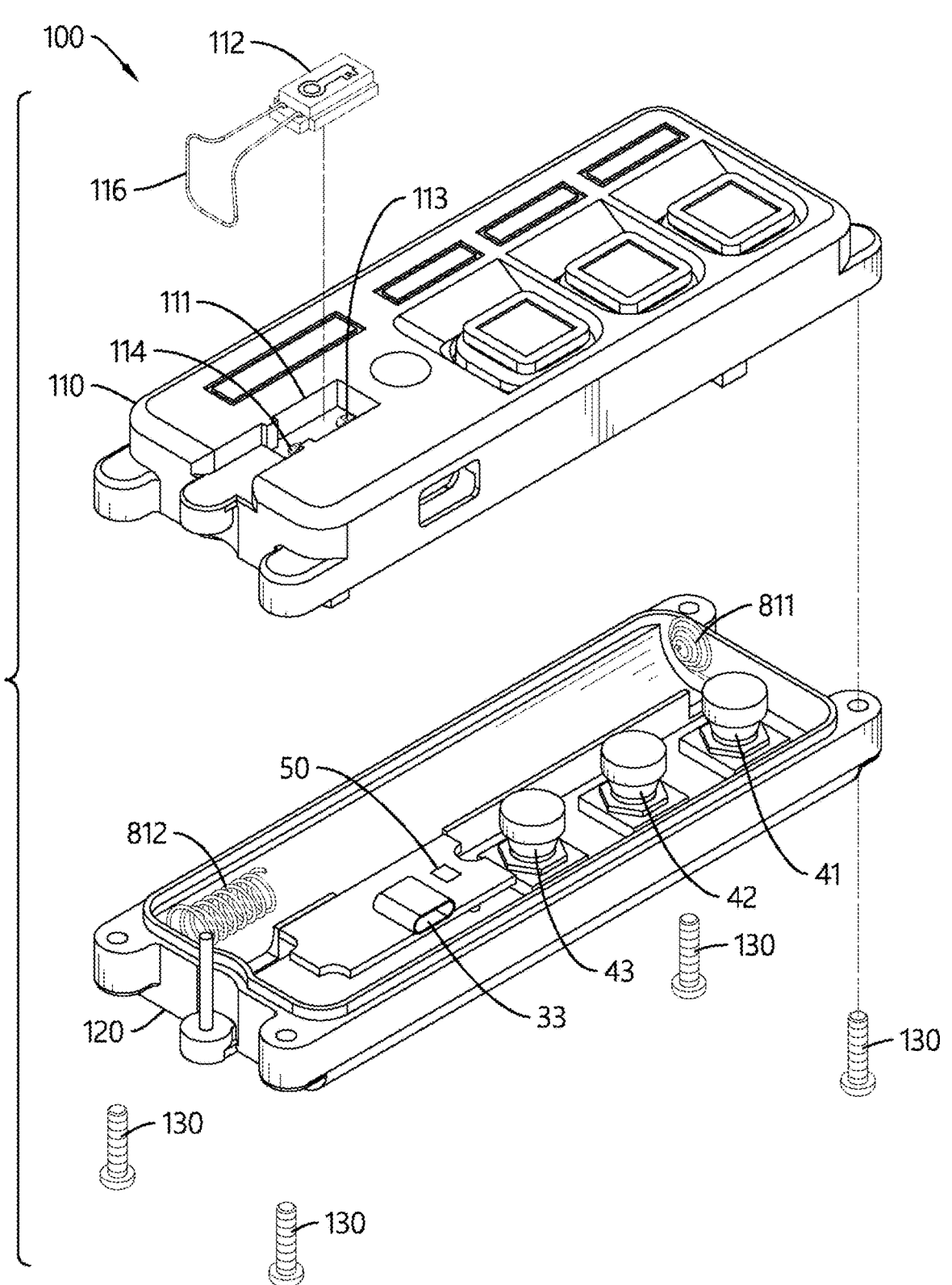
FIG. 3 is a partially exploded view of the remotely controlling and wirelessly receiving device of the present invention.

With further reference to FIG. 3, the upper shell component 110 and the lower shell component 120 are combined and fixed together with a plurality of bolts 130, and thus the bolts 130 allow the upper shell component 110 and the lower shell component 120 to be detachably combined. More particularly, the bolts 130 fix the lower shell component 120 to the upper shell component 110 by screwing into corresponding holes on the upper shell component 110, and thus combining the upper shell component 110 and the lower shell component 120 to be the shell of the remotely controlling and wirelessly receiving device 100.

Within the shell of the remotely controlling and wirelessly receiving device 100 lies a processor module 10, a wireless communications module 20, a port module 30, and a user interface. In an embodiment, the user interface is a buttons module 40, and the processor module 10 is electrically connected to the wireless communications module 20, the port module 30, and the buttons module 40. In another embodiment, the user interface of the shell of the remotely controlling and wirelessly receiving device 100 may also be a touch screen, or a combination of a screen and many buttons for inputs.

The wireless communications module 20 is configured to wirelessly connect to the electronic device 200. For example, a radio frequency (RF) unit 21 within the wireless communications module 20 is able to wirelessly transmit or receive data packages from the electronic device 200, and thus the RF unit 21 communicates with the electronic device 200. In an embodiment, the wireless communications module 20 with the RF unit 21 is a RF transceiver of model AS01-SPIPX that uses ISM radio bands around 2.4 GHz to 2.5 GHz for communications. The RF unit 21 is also electrically connected to the processor module 10. On the other hand, the port module 30 includes a port that is mounted on the shell. For example, the port module 30 includes a universal serial bus (USB) port 33 that is mounted on the upper shell component 110. In another embodiment, the wireless communications module 20 may use other communication protocols for wirelessly connecting to the electronic device 200, such as using Wireless Fidelity's (WiFi's) protocol to connect to the electronic device 200. In another embodiment, the port on the shell may also be a communication port of another kind of communication protocol.

In the present embodiment, the USB port 33 is electrically connected to the processor module 10, and the port module 30 is configured to wire-connect the external device 300 through the USB port 33. As such, the processor module 10 is able to communicate with the external device 300 through the port module 30. The external device 300 that is connected to the USB port 33 is a computer device, and the computer device is a general term encompassing various devices such as a desktop computer, a laptop, a tablet computer, or a smart phone.

When the buttons module 40 is pressed by the user, the buttons module 40 generates a control signal and outputs the control signal to the processor module 10. When the processor module 10 receives the control signal from the buttons module 40, the processor module 10 generates a control command according to the control signal, and the processor module 10 outputs the control command to the electronic device 200 through the wireless communications module 20. Furthermore, when the processor module 10 is wirelessly connected to the electronic device 200 through the wireless communications module 20, and when the processor module 10 is wire-connected to the external device 300 through the port of the port module 30, the processor module 10 receives a work data outputted by the electronic device 200 through the wireless communications module 20, and the processor module 10 sends the work data to the external device 300 through the port of the port module 30. In other words, as previously mentioned, the remotely controlling and wirelessly receiving device 100 of the present invention not only is capable of controlling the electronic device 200 from a distance with the control command, but also functions as a relay for delivering the work data from the electronic device 200 to the external device 300. The user who uses the remotely controlling and wirelessly receiving device 100, the electronic device 200, and the external device 300 may be an engineer responsible for handling and maintaining a plurality of the electronic devices 200. The said engineer would be able to effortlessly live-monitor a plurality of the work data of the electronic devices 200 by watching the external device 300 displaying the plurality of the work data that are received by the remotely controlling and wirelessly receiving device 100. As such, the user would be able to more-efficiently pick up on any of the electronic devices 200 that is acting abnormal, and thus more conveniently fast-react to the abnormal status of the electronic device 200 by sending out the control command via the remotely controlling and wirelessly receiving device 100 from a distance to appropriately maintain and handle the electronic device 200.

In an embodiment, the electronic device 200 working in collaboration with the present invention is a hydraulic device. In a technical field of hydraulic devices, by having the remotely controlling and wirelessly receiving device 100 of the present invention and having the external device 300 working in collaboration with the present invention, the user is able to effortlessly use and maintain the electronic device 200 with great efficiency.

In detail, the aforementioned USB port 33 belongs to a USB unit 32 of the port module 30, and the port module 30 also includes a universal asynchronous receiver/transmitter (UART) unit 31. The UART unit 31 is electrically connected between the processor module 10 and the USB unit 32 for handling a protocol conversion between an UART signal and an USB signal. For example, in the case of handling the work data, the UART unit 31 receives the work data in UART format from the processor module 10, the UART unit 31 then converts the work data from UART format to USB format, and then the UART unit 31 outputs the work data in USB format to the USB port 33 of the USB unit 32. On the other hand, the UART unit 31 is also capable of receiving data in USB format from the USB port 33, converting such data into UART format, and then sending the data in UART format to the processor module 10.

With reference to FIG. 1, in the present embodiment, the remotely controlling and wirelessly receiving device 100 further includes a light module 50, an audio module 60, a memory module 70, and a power module 80. The processor module 10 is also electrically connected to the light module 50, the audio module 60, the memory module 70, and the power module 80.

When the processor module 10 receives a status signal outputted by the electronic device 200 through the wireless communications module 20, the processor module 10 generates multiple notification signals according to the status signal. Two of the notification signals generated by the processor module 10 are an audio signal and a light signal. The processor module 10 delivers the audio signal to the audio module 60, and the processor module 10 delivers the light signal to the light module 50. The processor module 10 may also deliver another one of the notification signals to the external device 300 through the port module 30, allowing the external device 300 to obtain a working status of the electronic device 200 according to the notification signal.

The light module 50 includes at least one indicator light, and the at least one indicator light is electrically connected to the processor module 10. In an embodiment, the at least one indicator light is two light-emitting diodes (LEDs). The two LEDs are mounted in the shell and aligned with a transparent window on the upper shell component 110 for signaling light signals through the transparent window. The processor module 10 further determines whether receiving a data package of the work data from the electronic device 200.

When the processor module 10 has yet to receive the data package of the work data from the electronic device 200, the processor module 10 controls the light module 50 to display a first light mode according to the light signal. The first light mode, for example, corresponds to having the light module 50 display one of its LED lights.

When the processor module 10 has received the data package of the work data from the electronic device 200, the processor module 10 controls the light module 50 to display a second light mode according to the light signal. The second light mode, for example, corresponds to having the light module 50 display another one of its LED lights. In the present embodiment, the first light mode and the second light mode correspond to displaying lights of different colors, for example, the first light mode corresponds to a red light, and the second light mode corresponds to a green light. In another embodiment, the first light mode and the second light mode correspond to flashing lights with different frequencies or displaying lights with different brightness for visibly notifying the user that the data package is received by the processor module 10.

The memory module 70 is mounted in the shell, and the memory module 70 stores a plurality of audio files, thresholds, and Internet Protocol Addresses (IP addresses). The processor module 10 controls the RF unit 21 to connect to the electronic devices 200 according to the IP addresses stored by the memory module 70. The audio files stored by the memory module 70 include a first hydraulic device working audio file, a second hydraulic device working audio file, and multiple abnormal working status audio files.

In the present embodiment, when the electronic device 200 is generating mechanical strength for hydraulic applications, the electronic device 200 wirelessly outputs a hydraulic device working signal, and the hydraulic device working signal is the aforementioned status signal. As a result, when the processor module 10 receives the hydraulic device working signal from the electronic device 200 through the wireless communications module 20, the audio module 60 of the present invention generates an audio according to the audio signal. More particularly, the electronic device 200 may be used for different applications. For example, the electronic device 200 may be used for crimping transmission lines or cutting transmission lines. In accordance with the application the electronic device 200 is in, the electronic device 200 is able to code serials, that correspond to the application the electronic device 200 is in, into the data package of the hydraulic device working signal, thus indicating the hydraulic device working signal is currently a crimping mode working signal or a cutting mode working signal.

When the processor module 10 receives the crimping mode working signal through the wireless communications module 20, the processor module 10 controls the audio module 60 to generate an audio according to the first hydraulic device working audio file stored in the memory module 70. When the processor module 10 receives the cutting mode working signal through the wireless communications module 20, the processor module 10 controls the audio module 60 to generate an audio according to the second hydraulic device working audio file stored in the memory module 70. By hearing the type of audios played by the audio module 60, the user would be able to obtain a current working mode, be that a crimping mode or a cutting mode, of the electronic device 200 from afar. The user thus would gain an understanding of how to correctly control the electronic device 200 and subsequently send out the control command that is most appropriate through the remotely controlling and wirelessly receiving device 100 from a distance away.

When the electronic device 200 is working abnormally, the electronic device 200 may also encode an error code corresponding to an abnormal status into the data package of the work data. In other words, the work data outputted by the electronic device 200 may be an abnormal error data, and the data package encodes the error code of the abnormal error data. As such, when the processor module 10 receives the data package, the processor module 10 starts deciphering the error code from the data package. According to the error code deciphered, the processor module 10 controls the audio module 60 to play one of the abnormal working status audio files to make a corresponding audio signifying the abnormal status of the electronic device 200. As such, by hearing the type of audios played by the audio module 60, the user would be able to understand whether the electronic device 200 is working normally or abnormally, and if working abnormally, what sort of abnormality is the electronic device 200 facing. In an embodiment, the audio module 60 is a buzzer. In another embodiment, the audio module 60 is a speaker.

Please refer to the following Table F1:

TABLE F1

| Data Count: | Date: | Time: | Pressure (Bar): | Pressure (PSI): | Current (mA): | Error Code: |
|---|---|---|---|---|---|---|
| 1 | 2024 Feb. 27 | 16:03:02 | 688 | 9973 | 46 | N/A |
| 2 | 2024 Feb. 27 | 16:03:03 | 692 | 10027 | 48 | N/A |

When the external device 300 that collaborates with the present invention receives the work data or the notification signal, the external device 300 is able to display data that is represented in Table F1 through an application. The Table F1 shown above is only an example representing the types of data that are recorded, and hence in reality, the number of data counts may be more than just the two listed above. According to Table F1, each count of the data shows the electronic device 200, being a hydraulic device, has how much internal hydraulic pressure, consumes how much current, and whether has generated any error codes corresponding to any abnormal statuses at a certain time and date.

With reference to FIGS. 2 and 3, the buttons module 40 includes a frequency matching button 41, an increase pressure button 42, and a decrease pressure button 43. The processor module 10 is electrically connected to the frequency matching button 41, the increase pressure button 42, and the decrease pressure button 43.

When the frequency matching button 41 is pressed by the user, the control signal generated by the frequency matching button 41 is a frequency matching signal, and thus the processor module 10 sets the control command to be a frequency matching command that corresponds to the frequency matching signal, and the processor module 10 then sends the frequency matching command to the electronic device 200 through the wireless communications module 20. For example, the frequency matching command allows the remotely controlling and wirelessly receiving device 100 and the electronic device 200 to lock on to a certain frequency for communications, thus preventing a frequency mismatch between the remotely controlling and wirelessly receiving device 100 and the electronic device 200 when communicating.

When the increase pressure button 42 is pressed, the control signal generated by the increase pressure button 42 is an increase pressure signal, and thus the processor module 10 sets the control command to be an increase pressure command that corresponds to the increase pressure signal, and the processor module 10 then sends the increase pressure command to the electronic device 200 through the wireless communications module 20. The increase pressure command commands the electronic device 200 to increase hydraulic pressure internally in order to generate a greater amount of mechanical force.

When the decrease pressure button 43 is pressed, the control signal generated by the decrease pressure button 43 is a decrease pressure signal, and thus the processor module 10 sets the control command to be a decrease pressure command that corresponds to the decrease pressure signal, and the processor module 10 then sends the decrease pressure command to the electronic device 200 through the wireless communications module 20. The decrease pressure command commands the electronic device 200 to decrease hydraulic pressure internally in order to decrease mechanical force generated by the electronic device 200.

Figure 4:
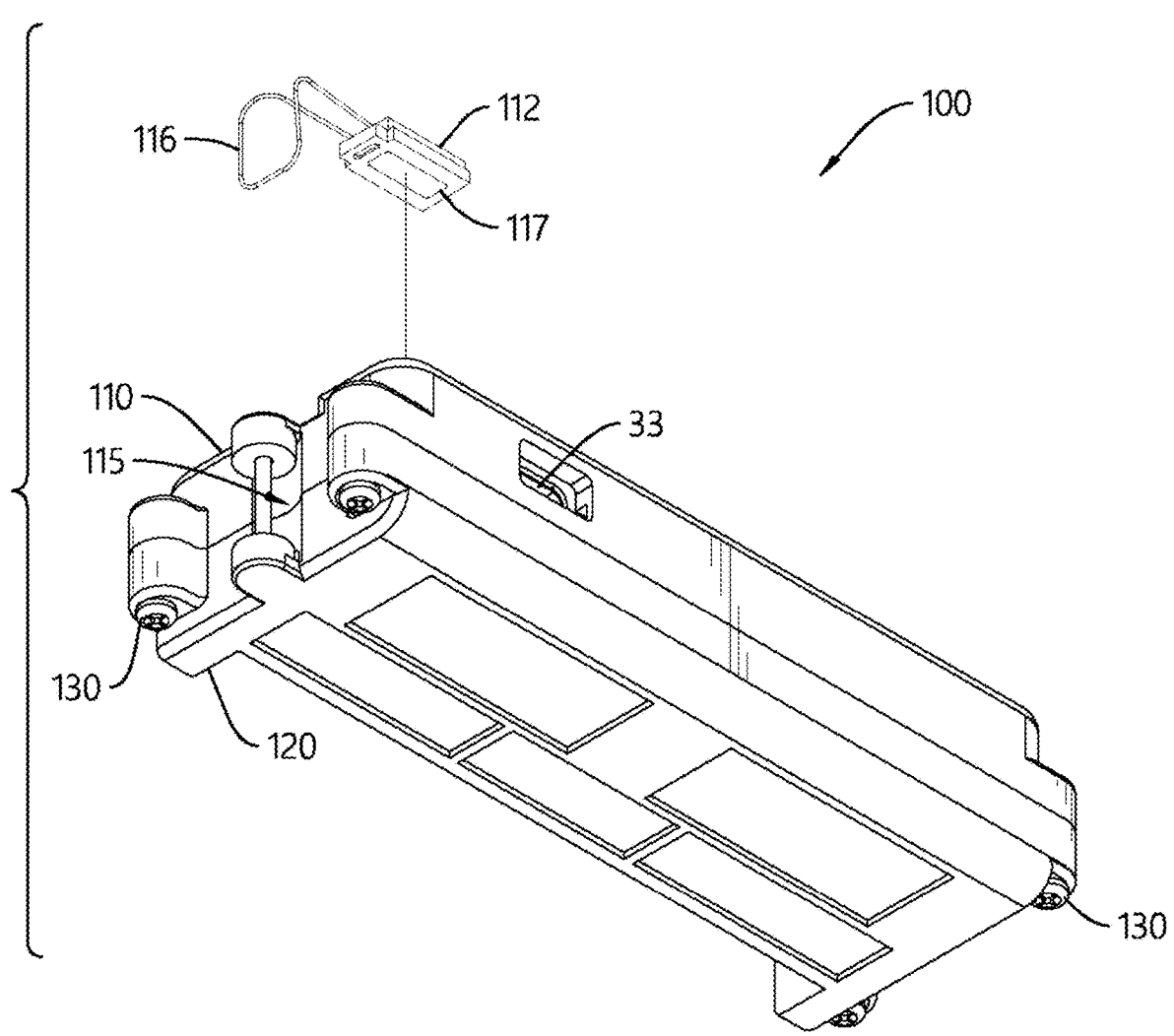
FIG. 4 is another partially exploded view of the remotely controlling and wirelessly receiving device of the present invention.
Figure 5:
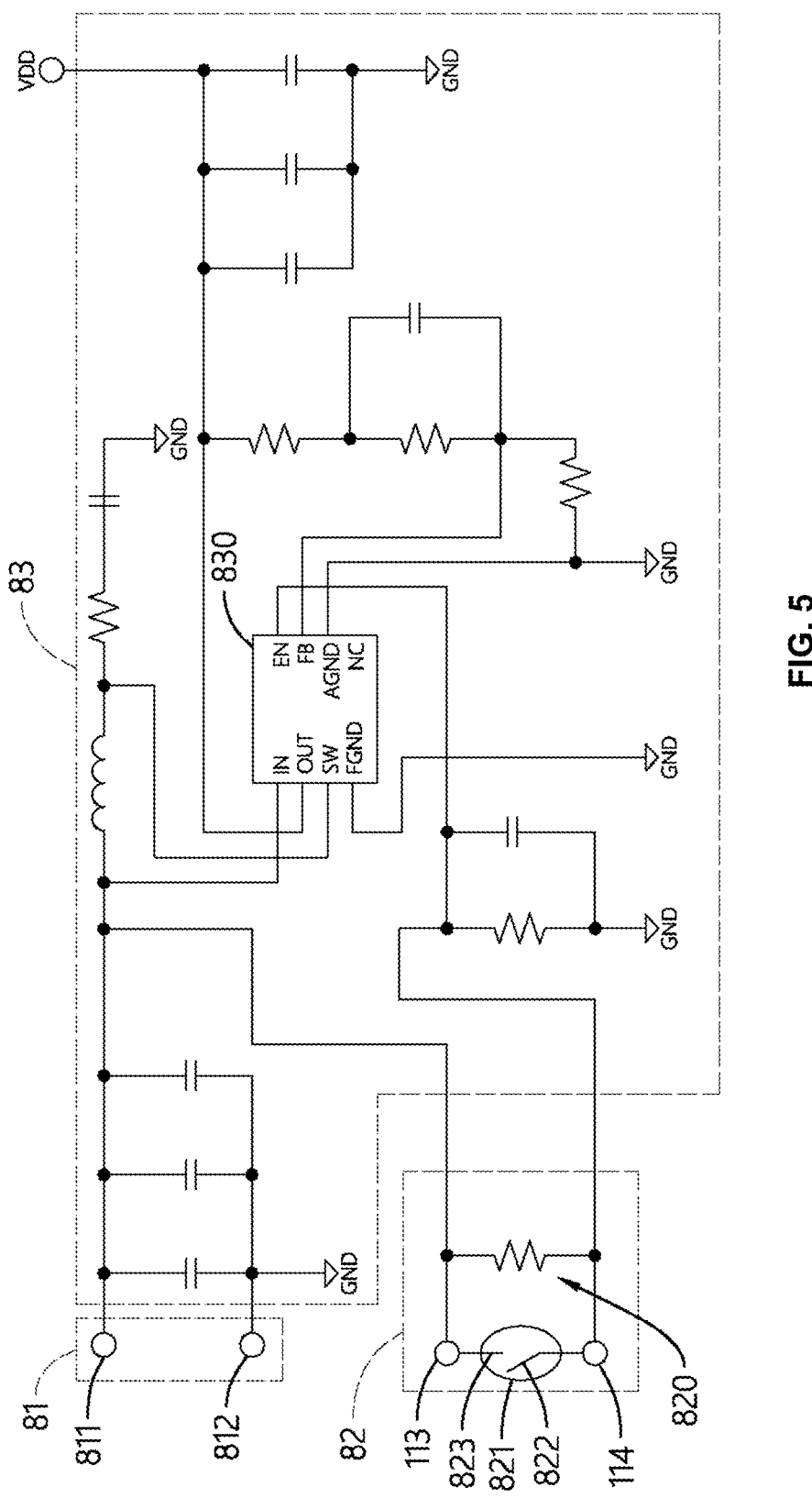
FIG. 5 is a circuit diagram of a voltage stabilizer unit of the remotely controlling and wirelessly receiving device of the present invention.

With further reference to FIGS. 4 and 5, the power module 80 of the present invention includes a battery unit 81, a safe circuit unit 82, and a voltage stabilizer unit 83. A first battery contact 811 and a second battery contact 812 of the battery unit 81 are mounted on the lower shell component 120. A space between the first battery contact 811 and the second battery contact 812 is configured to host at least one battery, allowing the battery unit 81 to receive a battery power of the at least one battery. When the upper shell component 110 and the lower shell component 120 are detached from each other, the at least one battery may be exposed and changed. When the upper shell component 110 and the lower shell component 120 are combined with each other, the battery unit 81 is thus enclosed in the shell.

The voltage stabilizer unit 83 is electrically connected between the battery unit 81 and the processor module 10. The voltage stabilizer unit 83 stabilizes the battery power to be a stabilized power, and the voltage stabilizer unit 83 provides the stabilized power to the processor module 10 in normal circumstances. In abnormal circumstances, the voltage stabilizer unit 83 stops providing the stabilized power to the processor module 10. The safe circuit unit 82 determines whether the battery unit 81 is under normal or abnormal circumstances for the voltage stabilizer unit 83.

The safe circuit unit 82 is electrically connected between the battery unit 81 and the voltage stabilizer unit 83, and the safe circuit unit 82 includes a first contact, a second contact, a resistor 820, and a reed switch 821. The resistor 820 and the reed switch 821 are respectively electrically connected between the first contact and the second contact. In other words, the resistor 820 and the reed switch 821 are connected in parallel between the first contact and the second contact.

Furthermore, the upper shell component 110 includes a groove 111 and a safe-conduction component 112. A bottom surface of the groove 111 includes a first bolt 113 and a second bolt 114. The first bolt 113 and the second bolt 114 are separated over a distance therein the groove 111. The first bolt 113 is the first contact of the safe circuit unit 82, and the second bolt 114 is the second contact of the safe circuit unit 82. The first bolt 113 and the second bolt 114 fix the reed switch 821 at a location corresponding to the groove 111 on an inner surface of the upper shell component 110.

The safe-conduction component 112 is a component that is matching the groove 111 and can be detachably combined into the groove 111. When the safe-conduction component 112 is combined with the groove 111, the safe-conduction component 112 directly electrically connects the first bolt 113 and the second bolt 114 within the groove 111. This direct electrical connection between the first bolt 113 and the second bolt 114 allows the first contact and the second contact to conduct electricity while bypassing the resistor 820 that is electrically connected between the first contact and the second contact. The reason why the resistor 820 is bypassed is as follows: the reed switch 821 includes a first reed 822 and a second reed 823, the first reed 822 is electrically connected to the first bolt 113, and the second reed 823 is electrically connected to the second bolt 114. The safe-conduction component 112 also includes a magnet 117.

When the magnet 117 contacts the first bolt 113 and the second bolt 114, the magnet 117 is able to directly conduct electricity between the first bolt 113 and the second bolt 114 with little electrical resistance, thus bypassing the resistor 820 that has significantly more electrical resistance between the first contact and the second contact.

Even when the magnet 117 has yet to contact the first bolt 113 and the second bolt 114, when the safe-conduction component 112 is at a close distance to the reed switch 821, the first reed 822 and the second reed 823 of the reed switch

821 would be displaced by a magnetic force of the magnet 117, thus allowing the first reed 822 and the second reed 823 to contact each other and form an electrical pathway. As a result, even the magnet 117 has yet to conduct electricity between the first bolt 113 and the second bolt 114, the first bolt 113 and the second bolt 114 within the groove 111 will still be able to conduct electricity through the first reed 822 and the second reed 823 of the reed switch 821 with little electrical resistance and thus bypassing the resistor 820.

In the present embodiment, the voltage stabilizer unit 83 is a voltage stabilizer chip 830, such as a chip of model MP3414. The voltage stabilizer chip 830 includes a first pin IN, a second pin OUT, a third pin SW, a fourth pin FGND, a fifth pin NC, a sixth pin AGND, a seventh pin FB, and an eighth pin EN. The first pin IN is electrically connected to the battery unit 81 for receiving the battery power. The second pin OUT is electrically connected to a power output contact VDD. The fourth pin FGND and the sixth pin AGND are respectively electrically connected to a ground GND. The fifth pin NC is an open circuit, and the third pin SW is configured to receive the battery power that has been voltage divided. The seventh pint FB is configured to receive the stabilized power that has been voltage divided. The eighth pin EN is electrically connected to the safe circuit unit 82. The power output contact VDD is electrically connected to the processor module 10 for providing the stabilized power to the processor module 10.

The voltage stabilizer chip 830 is important for electrically connecting to the processor module 10 through the second pin OUT and for determining whether to output the stabilized power from the second pin OUT to the processor module 10 according to a voltage level received on the eighth pin EN from the safe circuit unit 82. More particularly, when the resistor 820 of the safe circuit unit 82 is not bypassed, the eighth pin EN of the voltage stabilizer chip 830 receives electricity at a low voltage level. When the resistor 820 of the safe circuit unit 82 is bypassed, the eighth pin EN of the voltage stabilizer chip 830 receives electricity at a high voltage level.

When the voltage stabilizer chip 830 determines that the eighth pin EN receives electricity at the high voltage level, the voltage stabilizer chip 830 proceeds to stabilize the battery power into the stabilized power, and the voltage stabilizer chip 830 outputs the stabilized power from the second pin OUT to the processor module 10, thus allowing the processor module 10 to be electrically powered. When the voltage stabilizer chip 830 determines that the eighth pin EN receives electricity at the low voltage level, the voltage stabilizer chip 830 stops outputting the stabilized power from the second pin OUT to the processor module 10, thus preventing the processor module 10 to be electrically powered. In the present embodiment, the voltage stabilizer chip 830 of model MP3414 determines the high voltage level to be electricity with voltage greater than 0.8 volts, and the voltage stabilizer chip 830 determines the low voltage level to be electricity with voltage less than or equal to 0.8 volts.

In an embodiment, the shell that is combined by the upper shell component 110 and the lower shell component 120 includes a first closed loop 115. The safe circuit unit 82 is connected to a second closed loop 116, and the second closed loop 116 chains the first closed loop 115. As such, when the safe circuit unit 82 is detached and separated from the groove 111, the safe circuit unit 82 is hung to the shell, or hung between the upper shell component 110 and the lower shell component 120, by the first closed loop 115 and the second closed loop 116 that are chained together. This prevents the safe circuit unit 82 from being lost and keeps the safe circuit unit 82 closed to the shell.

In an embodiment, the processor module 10 and the memory module 70 are integrated into a chip of model number PIC16F1933. The UART unit 31 of the port module 30 is a chip of model number PL2303, and the USB unit 32 of the port module 30 is a chip of model number SBC-240S4.

In another embodiment, the processor module 10, the wireless communications module 20, the port module 30, and the memory module 70 are all integrated into a micro-controller unit (MCU), and particularly, the memory module 70 is an electrically-erasable programmable read-only memory (EEPROM). For example, the MCU is a control chip of model number PIC16F1947. The MCU along with the buttons module 40, the light module 50, and the audio module 60 are all mounted on a circuit board within the shell. The thresholds stored in the memory module 70 include a disconnection time threshold and a stop time threshold.

In an embodiment, the control command sent from the processor module 10 through the wireless communications module 20 to the electronic device 200 is a configuration command for configuring the electronic device 200. Furthermore, the memory module 70 stores a configuration file, and the configuration file includes at least one default configuration value. When the user interface, such as the buttons module 40, outputs the control signal to the processor module 10, the processor module 10 outputs the control command according to the configuration file to the electronic device 200 through the wireless communications module 20, thus loading the at least one default configuration value set in the configuration file to the electronic device 200.

The present invention only requires the user to one-time default configurations for the electronic device 200 upon first usage. Afterwards, any subsequent usage of the present invention can enjoy a convenience of inheriting the previously defaulted configurations to control the electronic device 200. In other words, after first usage, whenever the processor module 10 is connected to the electronic device 200 and is outputting the control command to the electronic device 200, regardless of the user of the present invention being a same person or a different person, the present invention will automatically load the at least one default configuration value to the electronic device 200, and thus efficiently configures the electronic device 200 to a workable condition.

Furthermore, when the port of the port module 30 stops connecting to the external device 300, and when the processor module 10 receives the work data outputted by the electronic device 200 through the wireless communications module 20, the processor module 10 first temporarily stores the work data in the memory module 70. Upon the port of the port module 30 once again connecting to the external device 300, the processor module 10 then outputs the work data temporarily stored from the port to the external device 300. This way, even if the port of the port module 30 suddenly stops connecting to the external device 300, the present invention is able to prevent the acquired work data from being lost. In other words, in the present embodiment, the present invention not only functions as a controller, but also as a data collector.

When the processor module 10 is connected to the external device 300 through the port of the port module 30, and when the processor module 10 receives the control command from the external device 300, the processor module 10 may also output the control command to the electronic device 200 through the wireless communications module 20. In other words, the control command outputted by the present invention is free to originate elsewhere, such as from the external device 300. As such, the present invention may also function as a relay for relaying the control command outputted from the external device 300 to the electronic device 200. Such a relaying feature allows the present invention to adopt to multiple different roles for controlling the electronic device 200, thus brings forth a multi-purpose practicality for the present invention.

Figure 6:
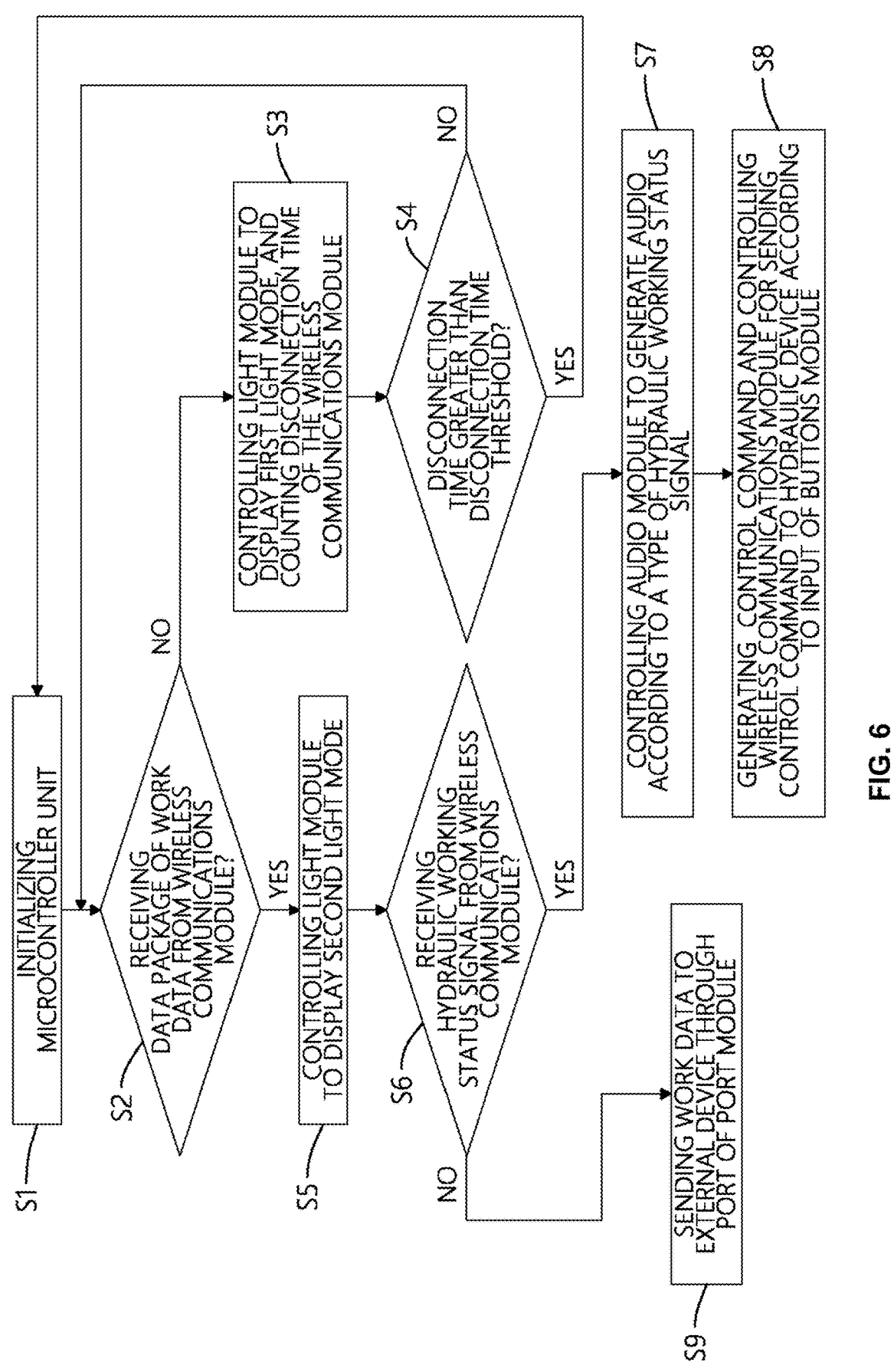
FIG. 6 is a flow chart of how the remotely controlling and wirelessly receiving device of the present invention communicates with an electronic device.

With reference to FIG. 6, in the present embodiment, the processor module 10 inside of the MCU executes the following steps:

Step S1: initializing the microcontroller unit.

Step S2: determining whether receiving a data package of a work data outputted by a hydraulic device from a wireless communications module. If yes, executing step S5, elsewise, executing step S3.

Step S3: controlling a light module to display a first light mode, such as controlling the light module to display a red light, and counting a disconnection time of the wireless communications module.

Step S4: determining whether the disconnection time is greater than a disconnection time threshold stored in a memory module. If yes, executing step S1, elsewise, executing step S2.

Step S5: controlling the light module to display a second light mode, such as controlling the light module to display a green light.

Step S6: determining whether receiving a hydraulic device working signal from the wireless communications module. If yes, executing step S7, elsewise, executing step S9.

Step S7: controlling an audio module to produce an audio according to a type of the hydraulic device working signal, such as according to the hydraulic device working signal being a crimping mode working signal or a cutting mode working signal. For example, controlling the audio module to generate an audio according to a first hydraulic device working audio file that is corresponding to the crimping mode working signal, or controlling the audio module to generate a different audio according to a second hydraulic device working audio file that is corresponding to the cutting mode working signal.

Step S8: generating a control command and controlling the wireless communications module for sending the control command to the hydraulic device according to an input of a buttons module.

Step S9: sending the work data to an external device through a port of a port module.

Figure 7:
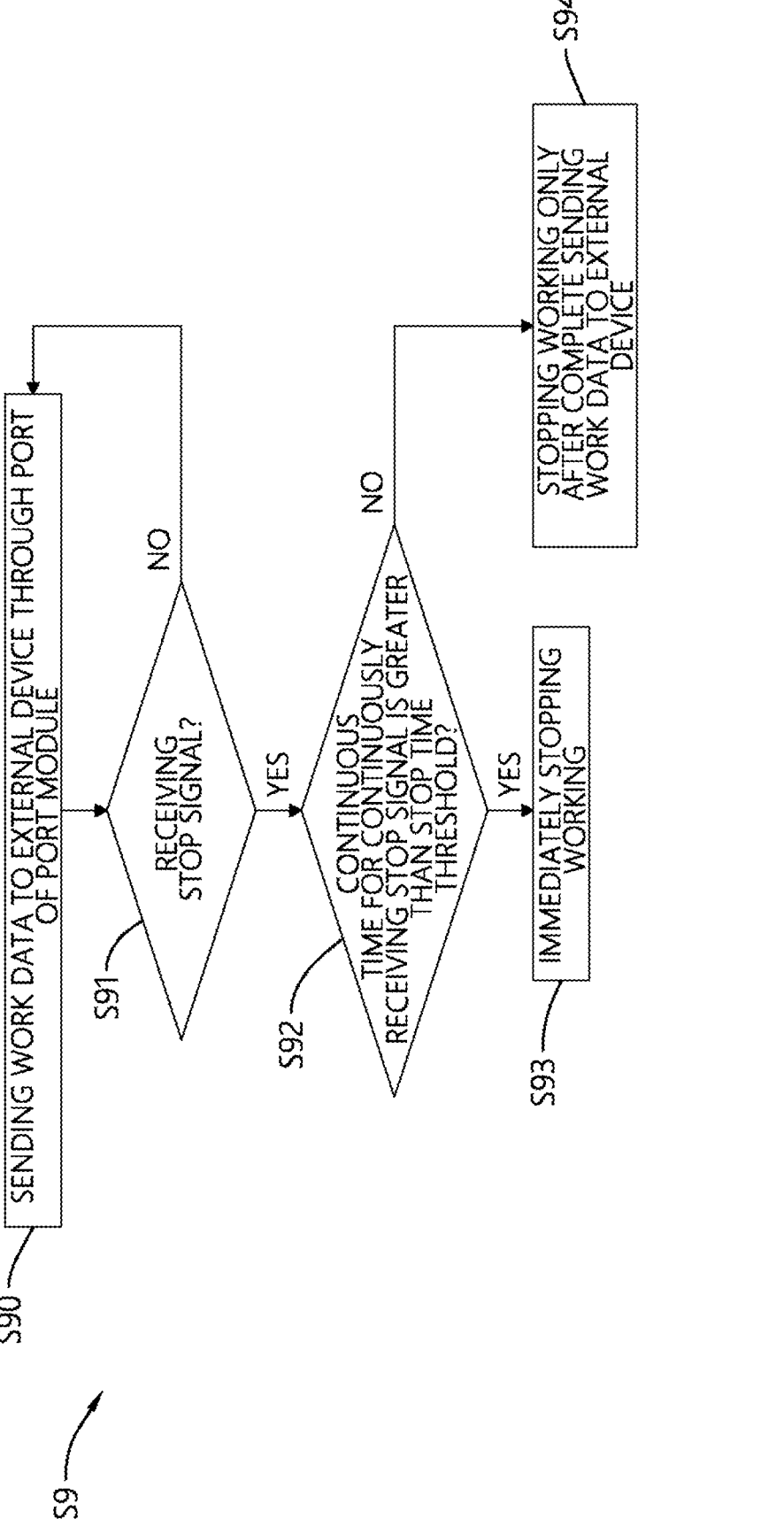
FIG. 7 is a flow chart of how the remotely controlling and wirelessly receiving device of the present invention sends a work data to an external device.

With reference to FIG. 7, the aforementioned step S9 further includes the following sub-steps:

Step S90: sending the work data to the external device through the port of the port module.

Step S91: determining whether receiving a stop signal. If yes, executing step S92, elsewise, executing step S90.

In an embodiment, the buttons module of the present invention includes a stop button. The stop button is electrically connected to the processor module. When the stop button is pressed, the stop button generates the stop signal to the processor module. In another embodiment, the stop signal may originate from the hydraulic device, the external device, or the said stop button of the present invention.

Step S92: determining whether a continuous time that is counted for continuously receiving the stop signal is greater than a stop time threshold that is stored in the memory module. If yes, executing step S93, elsewise, executing step S94.

Step S93: immediately stopping working, and thus immediately protecting the hydraulic device, the external device, and the remotely controlling and wirelessly receiving device.

Step S94: stopping working only after completing sending the work data to the external device, and thus ensuring the work data sent to the external device is complete.

What is claimed is:

1. A remotely controlling and wirelessly receiving device, comprising:

a shell;

a wireless communications module, mounted in the shell, and configured to wirelessly connect to an electronic device;

a port module, comprising a port, wherein the port is mounted on the shell, and configured to have a wired connection with an external device;

a processor module, mounted in the shell, and electrically connected to the wireless communications module and the port module;

a user interface, electrically connected to the processor module;

wherein when the user interface outputs a control signal to the processor module, the processor module sends a control command to the electronic device through the wireless communications module;

wherein when the processor module is wirelessly connected to the electronic device through the wireless communications module, and when the processor module is wire-connected to the external device through the port of the port module, the processor module receives a work data outputted by the electronic device through the wireless communications module, and sends the work data to the external device through the port of the port module;

wherein the electronic device is a hydraulic device, and the user interface is a buttons module;

wherein the buttons module further comprises:

a frequency matching button, mounted on the shell and electrically connected to the processor module; wherein when the frequency matching button is pressed, the control signal generated by the frequency matching button is a frequency matching signal, and thus the processor module sets the control command to be a frequency matching command that corresponds to the frequency matching signal, and the processor module sends the frequency matching command to the electronic device through the wireless communications module;

an increase pressure button, mounted on the shell and electrically connected to the processor module; wherein when the increase pressure button is pressed, the control signal generated by the increase pressure button is an increase pressure signal, and thus the processor module sets the control command to be an increase pressure command that corresponds to the increase pressure signal, and the processor module sends the increase pressure command to the electronic device through the wireless communications module;

a decrease pressure button, mounted on the shell and electrically connected to the processor module; wherein when the decrease pressure button is pressed, the control signal generated by the decrease pressure button is a decrease pressure signal, and thus the processor module sets the control command to be a decrease pressure command that corresponds to the decrease pressure signal, and the processor module sends the decrease pressure command to the electronic device through the wireless communications module.

2. The remotely controlling and wirelessly receiving device as claimed in claim 1, wherein the wireless communications module wirelessly communicates with the electronic device by wirelessly transmitting or receiving data packages from the electronic device over radio frequency (RF).

3. The remotely controlling and wirelessly receiving device as claimed in claim 1, wherein the external device is a computer device, and the port is a universal serial bus (USB) port.

4. The remotely controlling and wirelessly receiving device as claimed in claim 3, wherein the port module comprises:

a universal asynchronous receiver/transmitter (UART) unit, electrically connecting between the processor module and the USB port;

wherein the UART unit receives the work data in UART format from the processor module, converts the work data from UART format to USB format, and then outputs the work data in USB format to the USB port.

5. The remotely controlling and wirelessly receiving device as claimed in claim 1, wherein when the processor module receives a status signal outputted by the electronic device through the wireless communications module, the processor module generates a notification signal according to the status signal.

6. The remotely controlling and wirelessly receiving device as claimed in claim 5, further comprising:

a light module, electrically connected to the processor module;

wherein when the processor module receives the status signal, the processor module generates a light signal according to the status signal and sends the light signal to the light module;

wherein the light signal is the said notification signal.

7. The remotely controlling and wirelessly receiving device as claimed in claim 6, wherein the wireless communications module wirelessly communicates with the electronic device by wirelessly transmitting or receiving a data package from the electronic device;

wherein the processor module determines whether receiving the data package of the work data from the electronic device;

when receiving the data package of the work data from the electronic device, the processor module controls the light module to display a second light mode according to the light signal;

elsewise, the processor module controls the light module to display a first light mode according to the light signal.

8. The remotely controlling and wirelessly receiving device as claimed in claim 5, further comprising:

an audio module, electrically connected to the processor module;

wherein when the processor module receives the status signal, the processor module generates an audio signal according to the status signal and sends the audio signal to the audio module;

wherein the audio signal is the said notification signal.

9. The remotely controlling and wirelessly receiving device as claimed in claim 8, further comprising:

a memory module, mounted in the shell, electrically connected to the processor module, and storing a first hydraulic device working audio file and a second hydraulic device working audio file;

wherein the electronic device is a hydraulic device;

wherein when the processor module receives a crimping mode working signal as the status signal through the wireless communications module, the processor module controls the audio module to generate an audio according to the first hydraulic device working audio file;

wherein when the processor module receives a cutting mode working signal as the status signal through the wireless communications module, the processor module controls the audio module to generate another audio according to the second hydraulic device working audio file.

10. The remotely controlling and wirelessly receiving device as claimed in claim 8, further comprising:

a memory module, mounted in the shell, electrically connected to the processor module, and storing multiple abnormal working status audio files;

wherein the wireless communications module wirelessly communicates with the electronic device by wirelessly transmitting or receiving a data package from the electronic device over radio frequency (RF);

wherein the processor module receives the data package of the work data from the electronic device; the work data outputted by the electronic device is an abnormal error data, and an error code corresponding to the abnormal error data is encoded into the data package;

wherein according to the error code the processor module deciphered from the data package, the processor module controls the audio module to generate the audio signal with one of the abnormal working status audio files.

11. The remotely controlling and wirelessly receiving device as claimed in claim 1, further comprising:

a power module, mounted in the shell, and electrically connected to the processor module; wherein the power module further comprises:

a battery unit, mounted in the shell, and configured to receive a battery power from at least one battery;

a voltage stabilizer unit, being between the battery unit and the processor module for electrically connecting the battery unit and the processor module; wherein the voltage stabilizer unit stabilizes the battery power to be a stabilized power, and provides the stabilized power to the processor module;

wherein the shell comprises an upper shell component and a lower shell component; the upper shell component and the lower shell component are detachably connected to form the shell.

12. The remotely controlling and wirelessly receiving device as claimed in claim 11, wherein the power module further comprises:

a safe circuit unit, electrically connected between the battery unit and the voltage stabilizer unit, and comprising a first contact, a second contact, and a resistor that is electrically connected between the first contact and the second contact;

wherein the upper shell component further comprises:

a groove, therein mounts the first contact and the second contact that are separated over a distance from each other;

a safe-conduction component, detachably combined into the groove; wherein when the safe-conduction component is combined into the groove, the safe-conduction component allows the first contact and the second contact to directly electrically connect with each other;

wherein the voltage stabilizer unit is a voltage stabilizer chip;

when the voltage stabilizer chip receives electricity at a high voltage level, the voltage stabilizer chip stabilizes the battery power into the stabilized power and outputs the stabilized power to the processor module;

when the voltage stabilizer chip receives electricity at a low voltage level, the voltage stabilizer chip stops outputting the stabilized power to the processor module.

13. The remotely controlling and wirelessly receiving device as claimed in claim 12, wherein the safe circuit unit further comprises:

a reed switch, mounted in the shell, and comprising a first reed and a second reed; wherein the first reed is electrically connected to the first contact, and the second reed is electrically connected to the second contact;

wherein the safe-conduction component comprises a magnet; when the magnet is at a close distance to the reed switch, the first reed and the second reed are displaced by a magnetic force of the magnet, thus allowing the first reed and the second reed to contact each other and form an electrical pathway.

14. The remotely controlling and wirelessly receiving device as claimed in claim 12, wherein the shell that is formed by the upper shell component and the lower shell component comprises a first closed loop;

wherein the safe circuit unit is connected to a second closed loop, and the second closed loop chains the first closed loop.

15. The remotely controlling and wirelessly receiving device as claimed in claim 1, further comprising:

a memory module, mounted in the shell, electrically connected to the processor module, and storing a stop time threshold;

wherein when the processor module receives a stop signal and determines that a continuous time that is counted for continuously receiving the stop signal is greater than the stop time threshold, the processor module immediately stops working;

wherein when the processor module determines that the continuous time for continuously receiving the stop signal is less than or equal to the stop time threshold, the processor module only stops working after completing sending the work data to the external device.

16. The remotely controlling and wirelessly receiving device as claimed in claim 1, further comprising:

a memory module, mounted in the shell, electrically connected to the processor module, and storing a configuration file; wherein the configuration file comprises at least one default configuration value;

wherein when the user interface outputs the control signal to the processor module, the processor module sends the control command to the electronic device through the wireless communications module for loading the at least one default configuration value set in the configuration file to the electronic device.

17. The remotely controlling and wirelessly receiving device as claimed in claim 1, further comprising:

a memory module, mounted in the shell and electrically connected to the processor module;

wherein when the port of the port module stops connecting to the external device, and when the processor module receives the work data outputted by the electronic device through the wireless communications module, the processor module first temporarily stores the work data in the memory module, and upon the port of the port module once again connecting to the external device, the processor module then outputs the work data temporarily stored from the port to the external device.

18. The remotely controlling and wirelessly receiving device as claimed in claim 1, wherein when the processor module receives the control command from the external device through the port module, the processor module also outputs the control command to the electronic device through the wireless communications module.

19. The remotely controlling and wirelessly receiving device as claimed in claim 1, wherein the control command is a configuration command for configuring the electronic device.

* * * * *